Dec. 9, 1930.                D. W. RIPLEY                1,784,540
                         WEIGHT CHECKING DEVICE
                         Filed June 27, 1927          2 Sheets-Sheet 1

INVENTOR.
David W. Ripley
By Francis C. Huebner
Attorney.

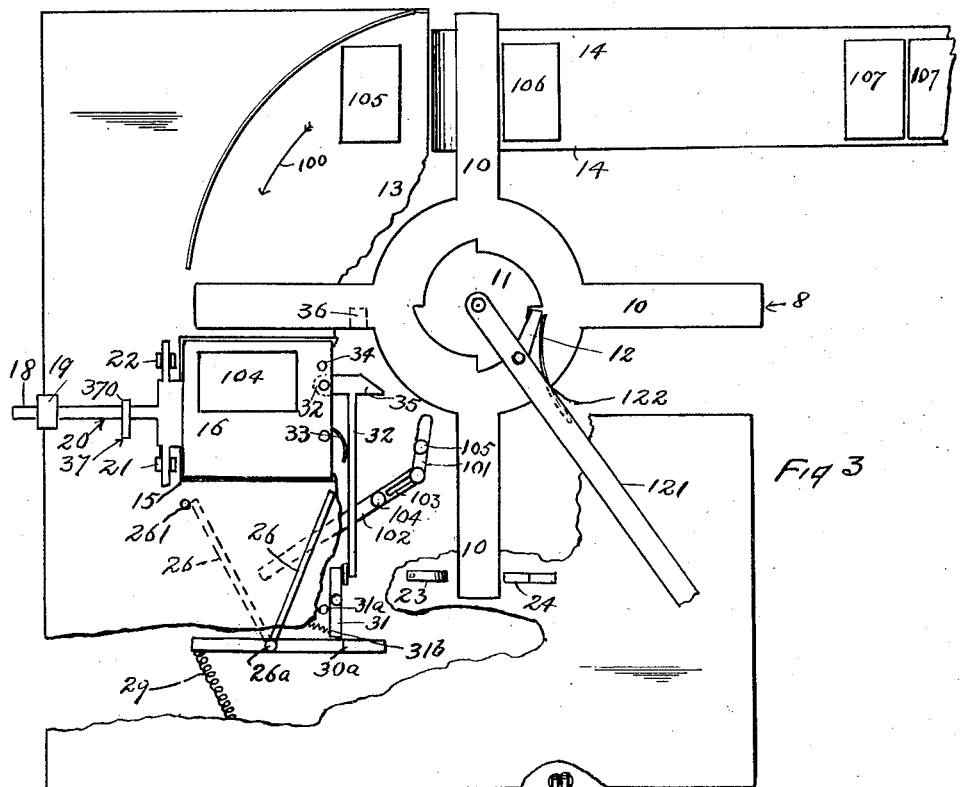

Patented Dec. 9, 1930

1,784,540

UNITED STATES PATENT OFFICE

DAVID W. RIPLEY, OF FRESNO, CALIFORNIA, ASSIGNOR TO SUN-MAID RAISIN GROWERS OF CALIFORNIA, OF FRESNO, CALIFORNIA, A CORPORATION

WEIGHT-CHECKING DEVICE

Application filed June 27, 1927. Serial No. 201,947.

My invention relates to a weighing device. In putting merchandise in cartons or packages for commercial purposes it is desirable to have the cartons or packages of uniform weights. To assure accuracy it has becomes a common practice to reweigh the individual packages and to segregate packages which are underweight or overweight from those in which the weight is within a fixed tolerance. Such reweighing should be done speedily and accurately. The device I have invented has for its object the automatic weighing of packages of merchandise rapidly and accurately and automatically discharging packages of the weight desired into one channel, and those which are overweight or underweight into other channels. The operations in my device are mechanical and positive. Other objects will hereinafter be disclosed.

Figure 1:
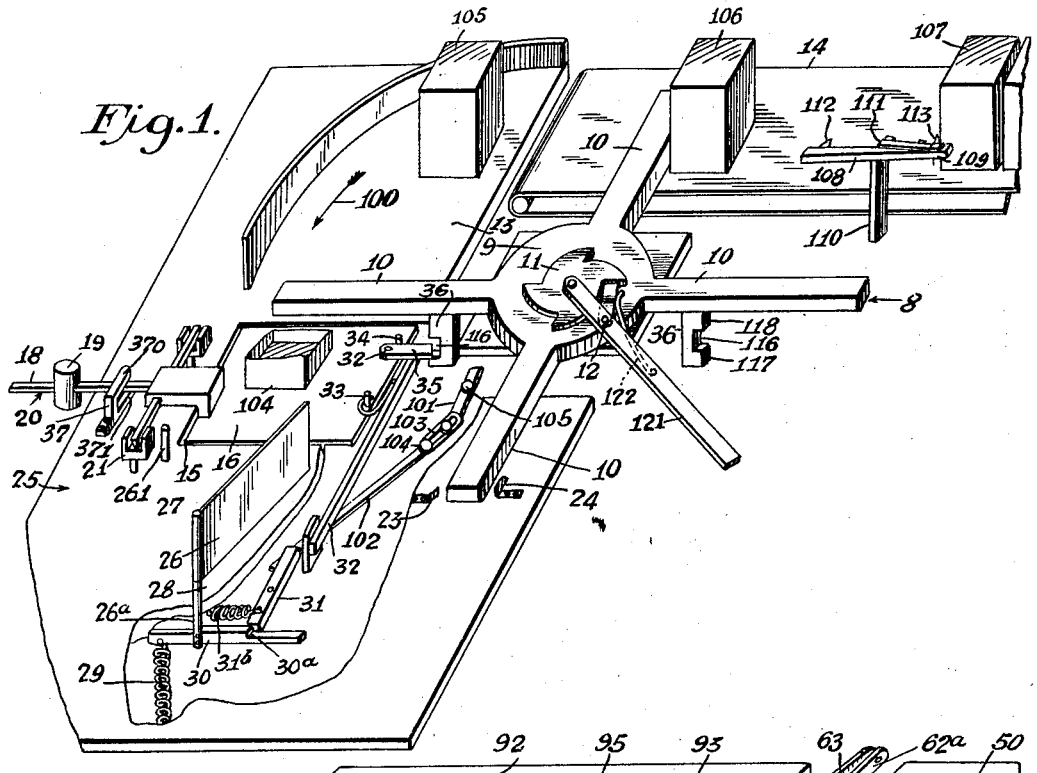
Figure 2:
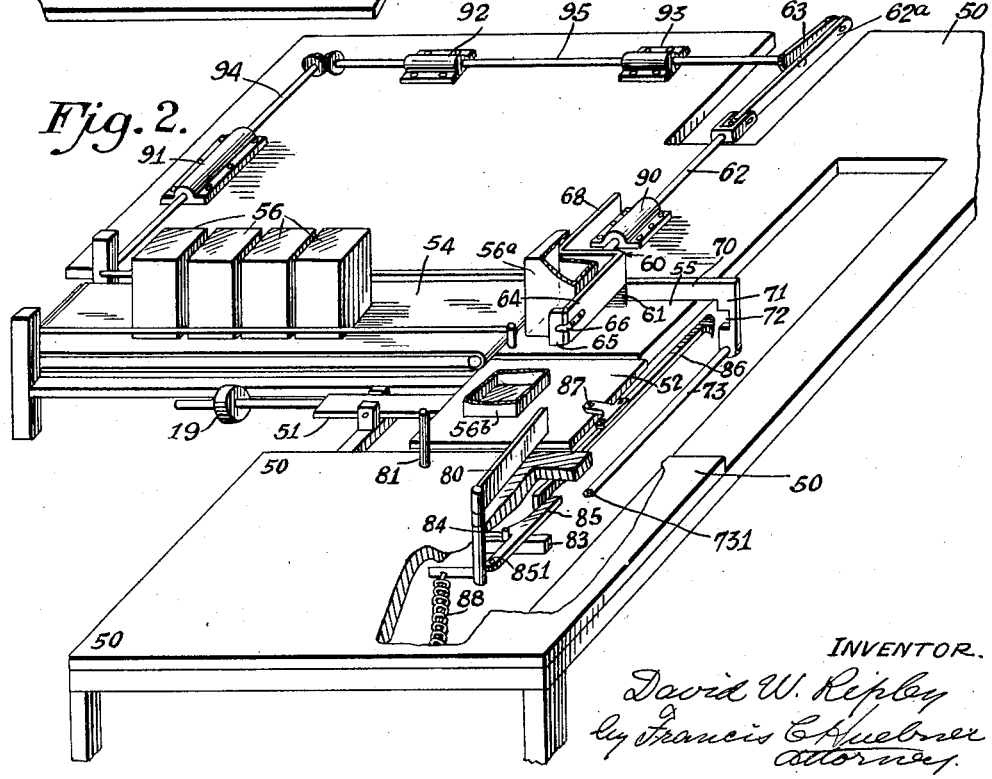

These objects are accomplished by means of the device hereinafter described and illustrated on the accompanying drawing, in which Fig. 1 shows a perspective view of one form of the device in operative relation. Fig. 2 shows a modified form in which the same result may be accomplished. Fig. 3 is a top plan view of the device illustrated in Fig. 1. Fig. 4 is a top plan view of the device illustrated in Fig. 2.

Referring to Fig. 1 in said drawing, I have shown a driving member 8 which consists of a hub 9 having a plurality of radial arms 10 extending therefrom. Driving member 8 is adapted to rotate so that intermittently the arms move a predetermined distance by means of the ratchet 11, which ratchet is operated by a pawl 12 which is in turn actuated by a lever 121 and is held in operative position by a spring 122. Directly under radial arms 10 is a slideway 13 to which cartons are fed by means of a moving conveyor 14, or by other common means not shown, to a position in line with the travel of the radial arms 10. The cartons are engaged by one of the radial arms as the arm moves across the path of the carton in the direction of arrow 100.

On slideway 13, and in the path of travel of radial arms 10, is a cut out portion 15, the object being to form an opening for the scale platform 16 hereinafter referred to. The scale assembly is shown as 20. It consists of the scale platform 16, a scale beam 18 which is pivotally mounted on posts 21 and 22. A weight 19 shown on the scale beam 18 is slidably mounted thereon. The scale assembly is positioned so that the top of platform 16 is approximately on the same plane as the top of the slideway. There can be a slight variation of the plane of the scale platform and slideway without interfering with the operation of my invention, as it is apparent that the scale platform has a slight vertical movement with varying weights thereon. It is preferable that stops be arranged to limit the movement of the scale platform so that the variation of the plane of the scale platform with underweight and overweight thereon will be comparatively slight. For this purpose stop 37, having an upper arm 370 will limit the upward movement of scale beam 18 and lower arm 371 will limit the downward movement of said beam. The scale platform is cut to size to fit loosely within the cut out portion 15 of the slideway.

Ratchet 11 is positioned on the hub 9 so that by the intermittent movement given it, lever 121 on arm 10 will push a carton on to the scale platform 16 to be weighed. For the purpose of releasing the radial arm 10 from contact with the carton while being weighed, a slight reverse movement of the arm is accomplished by a leaf spring 24 positioned in the path of travel of said arm. This spring is adapted to give the arm a slight reverse movement. On the succeeding impulse of the arm occasioned when the ratchet and pawl engage again to move the radial arm forward, the retarding spring bends down, permitting the radial arms to drag over it. The retarding spring is constructed with sufficient resiliency to overcome the momentum of the driving member and is positioned to reverse the movement of the driving member as explained. To limit the reverse movement, a stop spring 23 is poistioned in the line of travel of the radial arms so that when the arm is moved by the ratchet, spring 23 is depressed and the arm passes over it and spring 23 then resumes its normal position which is a stop against the reverse movement. By this means and adjustment, the amount of the reverse movement of the radial arm is slight and accomplishes only the purpose of releasing contact with the carton which the arm has pushed on to the scale platform. The next succeeding impulse of the driving member will move the carton which is on the scale platform to a discharging platform 25, and the arm of the driving member next adjacent to the one moving the carton off of the scale platform will move another carton on to the scale platform. The springs 23 and 24 will function to reverse the movement of this arm and release contact with the carton, and in regular sequence the functions hereinbefore described are repeated.

On the discharge platform I have pivoted a gate 26 which divides the discharge platform into two paths or portions. One may be termed the correct weight discharge path 27, and the other the incorrect weight discharge path 28. Gate 26 can be moved by swinging it to the right or to the left, which movement closes one or the other of said paths. Post 261 acts as a stop to limit the swing of the gate when actuated by spring 29. Spring 29 acts as a retarding element when the gate is swung against the spring tension. The gate is normally moved by a spring 29 to close one of these paths, and by said spring held in that position. In the drawing the correct weight discharge path 27 is the one normally closed by the spring. By means of a lever 30 which is rigidly attached at one end to the gate, a movement of the lever having its pivotal point where the gate is attached thereto, will move the gate against the tension of spring 29 so that the incorrect weight discharge path 28 is thereby closed and the correct weight discharge path is open. A pivoted catch 31 is positioned to hold the lever 30 against the resiliency of the spring. This catch is normally held against a stop 31a by means of a spring 31b. The lever 30 is moved to the position of engaging the catch 31 by the intermittent movement of the radial arms, hereinafter explained.

A member 36 is attached to and depends from each arm 10 as hereinafter more definitely set forth. A lever 101 is pivoted between its ends at pivot 105 to the under side of table top 25 so that one end thereof is in the path of portion 117 of said member 36 and will be moved by it. This lever is slidingly attached to another lever having an arm 102 which can have a swinging movement on pivot 104, the path of which intercepts the path of the pivotal movement of lever 30. The slotted portion of the lever opposite arm 102 is designated on the drawing 103. It will be noted that when the arms 10 revolve with their intermittent movement the function of lever 101 and the lever consisting of slotted end 103 and arm 102 will be to push back lever 30 until the latch 31 is in position adjacent shoulder 30a and holds the gate in a position against spring 29.

The carton on the scale being weighed is designated 104, the one on the platform ready to be engaged by arm 10 and carried to the scale platform on the next impulse of the driving member 8 is designated 105, and two cartons on the conveyor are designated 106 and 107 respectively. For the purpose of feeding the cartons singly on to the platform 13, I have arranged a stop lever having arms 108 and 109 extending on each side of the fulcrum post 110. On the arms are attached projections 112 and 113 which are spaced apart the width of a carton. A spring 111 normally holds the projection 113 engaged with a carton. As arm 10 rotates it strikes the arm 108 and moves the lever so that the projection 113 permits a carton to move past it, and projection 112 intercepts the movement of the carton. When arm 10 disengages the stop lever the carton engaged by projection 112 is released and the movement of the conveyor can carry it on to the platform 13, and the projection 113 acts as a stop for the entire row of cartons represented as 107, until the next intermittent movement when another single carton is released. The conveyor is constructed so that it can drag under the cartons when they are blocked.

On the scale platform is pivoted a trip lever 32 which extends to, and is adapted to trip the catch 31. This trip lever is held in operative relation with the catch by means of the trip lever spring 33 and by means of a stop pin 34 the movement of the trip lever is limited. It is here noted that the trip lever 32, the spring 33, and stop pin 34 are all connected with the scale platform and do not rest upon or drag upon any other part of the device except that the trip lever can engage the catch 31 so that it will trip catch 31 as hereinafter explained. It is noted that the tripping of catch 31 is effected so that a slight pressure only is necessary to make it function. The trip lever 32 has a boss 35. It is also noted that the trip and boss 35 are positioned with relation to the scale platform so that the vertical movement of the paltform caused by varying relative weights on the scale platform and scale beam, will move the boss up or down. Each radial arm has depending therefrom a bifurcated member 36 which is positioned so that its line of travel will be such that the boss 35 will pass through the opening 116 in the bifurcated member 36 when the scale is balanced. When the scales are not balanced and the scale platform is either above or below the normal level of the scale platform when balanced, the boss will be engaged by the portion 118 of member 36 above opening 116, or by portion 117 below said opening, and give the boss a swiping blow which actuates the tripping lever.

The essentials of my invention are the movement of the carton upon a scale platform so that the carton is free from contact with objects not connected with the scale when the carton is being weighed, a gate vertically pivoted and postioned so that when the carton is pushed off of the scale platform it will pass down one of two paths, the one being for cartons of the correct weight and the other for cartons of incorrect weight, the gate being set against spring tension to close the path for the incorrect weight cartons and to open the path for correct weight cartons. If a carton having the correct weight is placed upon the scale platform, the scale balances and the boss 35 connected with trip lever 32 will not be engaged by the bifurcated member, and on the next impulse of the driving member the carton will be moved from the scale platform to the path for conveying cartons of correct weight. If the carton is underweight or overweight, the movement of the scale platform will be above or below the plane which it normally assumes when a carton of the correct weight is placed thereon, and the member 36 will engage boss 35, which by the sequence hereinbefore detailed will trip the catch holding the gate in position against the resiliency of gate spring 29, which spring will move the gate to close the path for cartons of correct weight, and open the path for cartons of incorrect weight, and the movement of the radial arm will push the carton into the path which was provided for its classification. When the carton containing the incorrect weight has thus been disposed of, the movement of the radial arm will move the lever 30 so that the path for the incorrect weight cartons is closed and the other path is open. It is here noted that modifications as to the shapes of the arms and levers illustrated and as to the details of the trips, catches and other elements, may be changed without departing from the spirit of my invention.

A modified form of my invention is shown in Figs. 2 and 4. A table 50 is represented as the base upon which the device is installed. A scale 51 has a platform 52 arranged approximately on the same plane as table 50. The scale balancing weight is marked 19. A conveyor 54 is adapted to carry cartons 56 on to a fixed platform 55. The carton on the fixed platform is designated 56a, and the one on the scale platform 56b. A reciprocating member 60 is positioned to push the cartons from the fixed platform to the scale platform, and off the scale platform. It consists of a main push block 61 which is given a back and forth movement by a push rod 62 actuated by a crank 63. A connecting link 62a connects push rod 62 with crank 63. The push block is positioned as shown in Fig. 2 to receive the carton 56a from the moving conveyor 54. At the time for moving the carton to the scale platform, the push block 61 moves toward the scale platform pushing before it a carton which will be located by said push block approximately where the carton 56b is located. An arm 64 is attached at right angles to push block 61 at the edge farthest from the conveyor. It functions as a stop for cartons moved by the conveyor to the fixed platform so that each carton deposited on the fixed platform is in line with the travel of the push block, and it also functions in connection with the end block 65 to push the carton off of the scale platform before an unweighed carton is pushed on. This is done by block 65 engaging carton 56b on its forward movement. Block 65 should extend far enough forward to push the carton 56b entirely off of the scale platform on the forward movement of push block 61. On the retreat movement of the reciprocating member, the spring 66 permits block 65 to drag past the carton and when it is past the carton, block 65 again assumes an angular position with relation to arm 64 so that on the next forward movement it is positioned to push the carton 56b off the platform. Attached at right angles to block 60 on the edge nearest the conveyor and extending rearwardly therefrom, is a stop 68 which passes along the edge of the conveyor as the push block moves forward, thus stopping the delivery of additional cartons to the fixed platform until the carton which was thereon has been moved on to the scale platform and the push block has been returned for another carton. To push block 60 is attached an arm 70 having a depending dog 71 in which is a notch 72. The lower part of dog 71 has a push bar 73 extending forward therefrom. The arm 70, the depending dog 71, and the push bar 73 move together as a unit. A gate 80 is positioned on the table 50 on the line of travel of the cartons when pushed from the scale platform. The gate can have a horizontal oscillatory movement, which is limited in the one direction by a post 81. It is held a spaced distance from post 81 by means of a lever 83 having a pin 84 therein which is engaged by a catch 85, which is pivoted at its end with pivot 851 to the under side of table 50. Catch 85 is normally held in engagement with pin 84 by a spring 88. On the scale platform is a pivoted trip 86, the pivot being represented as 87. When the scale is balanced the trip passes through the notch 72 and does not function. If the scale platform is slightly above or below the plane on which it is balanced, dog 71 will intercept the trip 86 and cause it to function to release the catch 85 with its engagement with pin 84. When this is done the spring 88 will cause gate 80 to close the path over which the correct weight cartons travel and the carton will be forced over the path to the right of gate 80. In the same forward movement when the carton has started on its path, the push bar 73 will reset the gate against the tension of spring 88 to be ready for the movement of the next weighed carton. This resetting is accomplished by the end 731 of rod 73 on its forward movement engaging lever 83 and pushing it to a position where trip 85 will engage pin 84. The push rod 62 passes through a sliding bearing 90. Bearings 91, 92, and 93 are positioned to carry shafts 94 and 95 which transmit the power for actuating the conveyor 54 and the reciprocating member 60, and attachments thereto.

Other forms for applying the principle of my invention can be used without departing from the spirit of my invention.

Having described my invention I claim:

1. In a weight checking device the combination of a balancing scale having a platform, means for moving objects to be weighed upon and off said platform, a gate pivoted and positioned to selectively direct the movement of the object from the platform, said gate being held in one of said positions by means of a catch, means for tripping said catch attached to the scale platform and means for actuating the tripping means attached to the means for moving the object off the scale platform, and positioned so that said means for actuating the tripping means will not engage the tripping means when the scale platform is balanced, and that the tripping means will be engaged by the means for actuating the tripping means when said scale platform is not balanced.

2. In an automatic weight checking device the combination of a slideway, a scales having a platform adapted to have a movement by varying the weight placed thereon, means for moving objects to be weighed off the scales platform on to the slideway, a gate pivotally mounted on said slideway adapted to be selectively positioned so that the objects moved thereon are diverted to one side or to the other side of said gate, means for positioning said gate consisting of a lever attached thereto adapted to move the gate to either of said two selective positions, spring means adapted to normally move said gate in one of said selective positions, and a catch adapted to hold said lever against the spring means when the gate is placed in the other of said selective positions, tripping means pivotally attached to the scale platform, means for actuating the tripping means at selective times consisting of an actuating member adapted to have a reciprocal movement with the means for moving the object from the scale platform, the actuating member being positioned for engagement with the tripping means only when the scale platform is in a predetermined position, to-wit, unbalanced, and means adapted to reset said gate in the selective position against the resiliency of said spring.

3. In an automatic weight checking device, the combination of a weighing scale having a platform, said platform being adapted to have a movement by varying the weight placed thereon, means for moving objects on to and off said platform along defined paths, a gate pivotally mounted adjacent to said platform, said gate being positioned to adapt it to be swung forth and back across the normal defined path of the objects moved off of said platform, spring means for normally holding said gate in a position obstructing said normal path and adapted to guide said objects being moved off said platform into a by-path, means for moving said gate against said spring tension to a position not obstructing said normal path, catch means for holding the gate in such position against the spring tension, means for tripping said catch actuated synchronously with the means for moving objects on to and off said scale platform consisting in part of a member adapted to have a back and forth movement, an engaging member attached to the scale platform and movable therewith adapted to engage said tripping means and to cooperate to make it function to trip said catch when the scale platform is above or below a fixed level consisting of a stop having a recess cut therein, and positioned so that in the movement of the tripping means forth and back said tripping means will pass into said recess and not engage the stop means when the scale platform is on said predetermined level, and will be positioned to engage said tripping means when the scale platform is above or below said level.

DAVID W. RIPLEY.